(Model.)
R. A. BURNETT.
Plow.
No. 242,266.  Patented May 31, 1881.
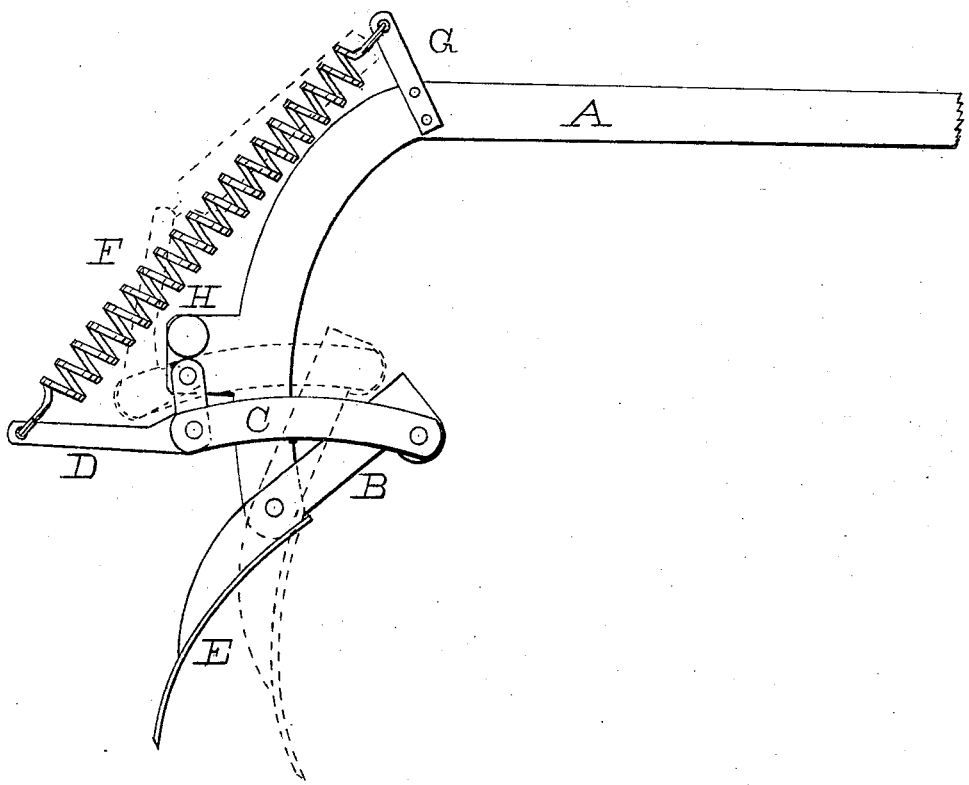
WITNESSES:
W. C. Nelson
Jno W Snavely
INVENTOR
Robert A. Burnett
BY B. Pickering
ATTORNEY

UNITED STATES PATENT OFFICE.

ROBERT A. BURNETT, OF WASHINGTON COURT-HOUSE, OHIO, ASSIGNOR OF TWO-THIRDS TO AMOS THORNTON AND JOSEPH D. OGLE, OF SAME PLACE.

PLOW.

SPECIFICATION forming part of Letters Patent No. 242,266, dated May 31, 1881.

Application filed March 30, 1881. (Model.)

*To all whom it may concern:*

Be it known that I, ROBERT A. BURNETT, of Washington Court-House, in the county of Fayette and State of Ohio, have invented a new and useful Improvement in Plows, of which the following is a specification.

My invention relates to cultivator-plows; and it consists in a pivoting to the draft-beam of a plow a short beam to which is bolted the shovel, and combined with this short beam are arms, lever, and spring to hold the shovel while the plow is being operated, and to release the same when the shovel comes in contact with an unyielding obstruction. Then the shovel is thrown back and resumes its proper position by the action of the spring, when the obstruction is passed.

The accompanying drawing is made a part of my specification, in which the figure presents a side view of the improved plow, with the plow thrown back for clearness in illustration. For the same purpose the dotted lines represent the parts not in the exact position they should be in, but nearly the position the parts are in when the plow is being operated. When in proper position the shovel-beam is very nearly on a line with the vertical part of the draft-beam.

A represents a wrought-iron beam, to the rear upper part of which is attached the stay G, which may be bolted to the beam or surround it as a clamp, and be moved along the beam to adjust the tension of the spiral spring F. The office of this stay is to hold the upper end of the spring, which is attached to the eye of the same. This beam has a rear projection, which sustains the pivot that supports the lever, and directly over the pivot is the stop-lug H. The lower rear end of the same has a pivot on which is supported the shovel-beam B. The attachment for draft at the front end may be by any of the various means practiced. The shovel-beam is of one piece, made of wrought-iron, the upper part embracing the draft-beam, and to the lower end is bolted the shovel E. At its upper end are two ears, to which are pivoted the two bars C. These bars are likewise pivoted to the angular lever D. The inner end of this lever is supported on a pivot on the rear projection of the draft-beam, and to the outer end is attached the spiral spring.

The dotted lines illustrate the movement of the parts. When the shovel-beam is nearly on a line with the draft-beam the arms engage the stop-lug and arrest the further movement. In this position the arm and lever pivots are to the rear of the beam-pivot and slightly lower, and then the draft is sustained by these pivots. The spiral spring serves to hold the parts in this position, and when an obstruction is met sufficient to overcome the tension of the spring the shovel flies back, permitting it to rise over the obstruction, when it regains its proper position for work.

The advantages are that when unyielding obstructions are met the plow or cultivator passes over them without injury to plow, harness, or animals.

What I claim as my invention, and desire to secure by Letters Patent, is—

The draft-beam A, with projection for stop-lug and pivot, and stay G, in combination with shovel-beam B, arms C, lever D, and spring F, substantially as and for the purpose set forth.

ROBERT A. BURNETT.

Witnesses:
M. WILLARD,
W. H. DIAL.